(No Model.)　　　　　　　　　　　　　　　　　　　4 Sheets—Sheet 1
M. FORTEÑO, Dec'd.
P. B. TURPIN, Administrator.
TICKET HOLDER AND REGISTER.
No. 604,923.　　　　　　　　　　　　　Patented May 31, 1898.
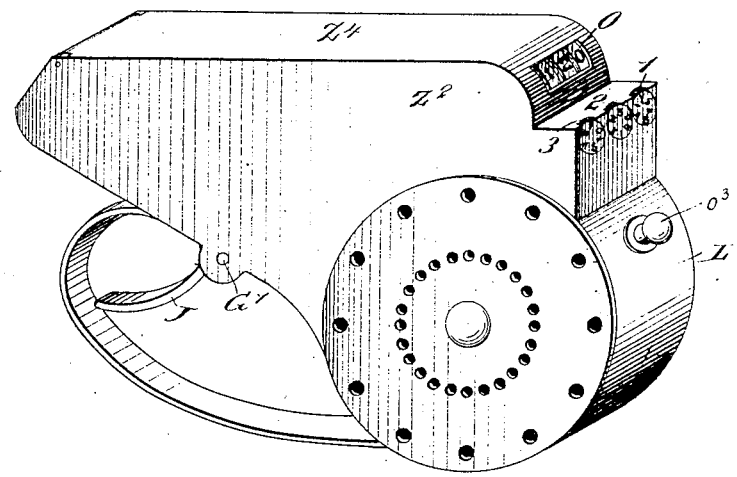
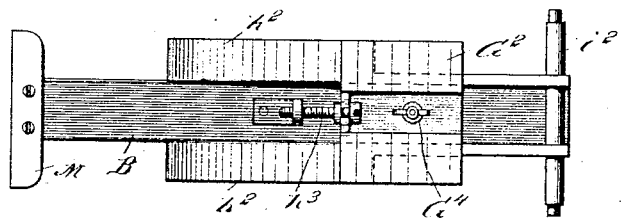
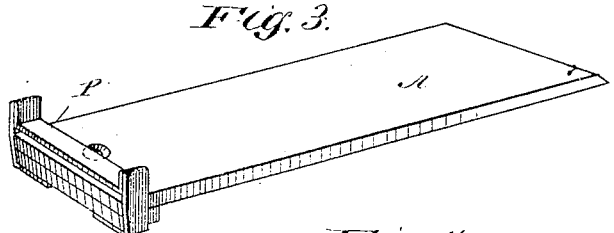
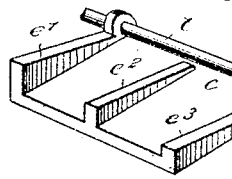
WITNESSES:
John Bergstrom
John Lotka
INVENTOR
Manuel Forteño
(DECEASED)
Perry B. Turpin,
ADMINISTRATOR.
BY Munn & Co.
ATTORNEYS.

(No Model.) 4 Sheets—Sheet 2.

M. FORTUÑO, Dec'd.
P. B. TURPIN, Administrator.
TICKET HOLDER AND REGISTER.

No. 604,923. Patented May 31, 1898.

WITNESSES:
Joshua Bergstrom
John Lotka

INVENTOR
Manuel Fortuño
(DECEASED)
Perry B. Turpin
ADMINISTRATOR.
BY Munn & Co.
ATTORNEYS.

(No Model.) 4 Sheets—Sheet 3.
M. FORTUNO, Dec'd.
P. B. TURPIN, Administrator.
TICKET HOLDER AND REGISTER.
No. 604,923. Patented May 31, 1898.
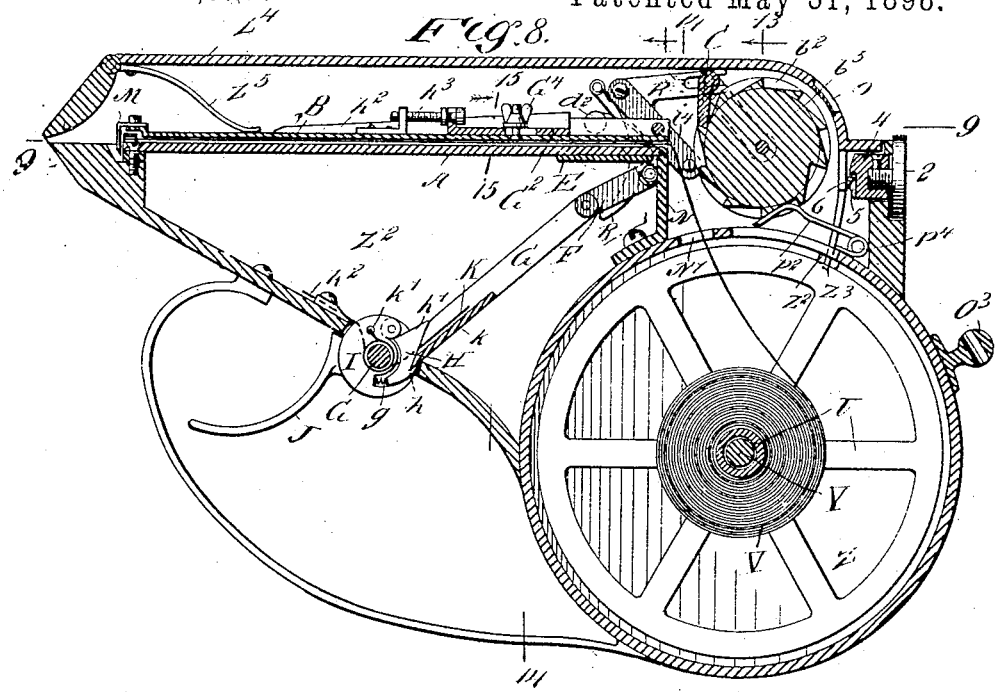
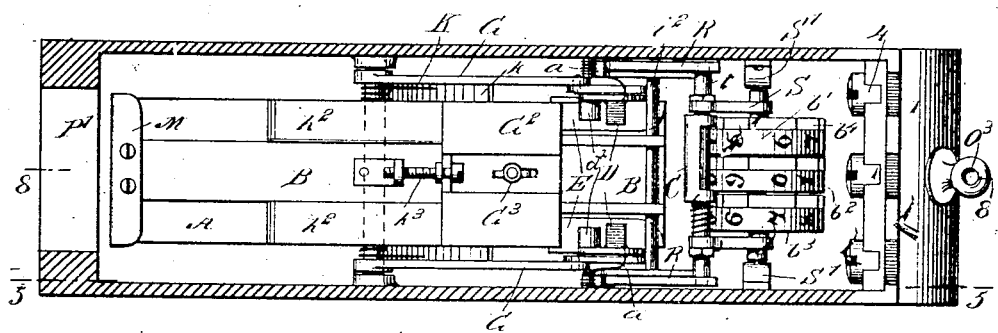
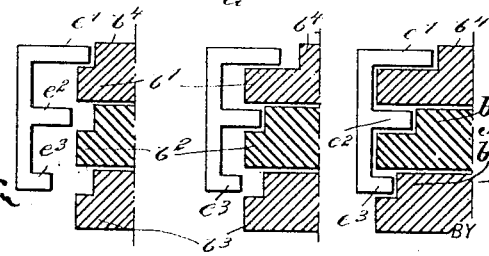
WITNESSES:
Johna Bergstrom
John Lotka
INVENTOR
Manuel Fortuñu
(DECEASED)
Perry B. Turpin
ADMINISTRATOR.
BY
Munn & Co.
ATTORNEYS.

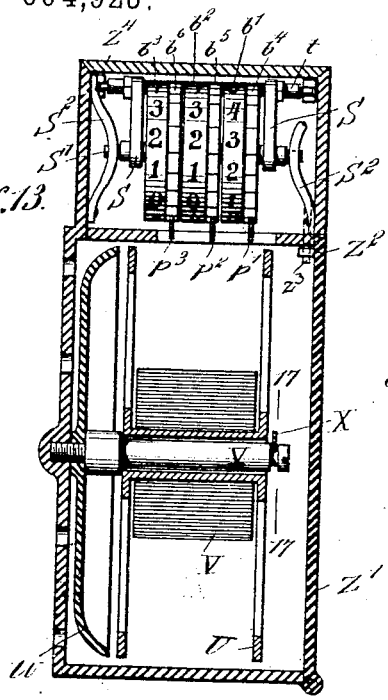

UNITED STATES PATENT OFFICE.

PERRY B. TURPIN, OF WASHINGTON, DISTRICT OF COLUMBIA, ADMINISTRATOR OF MANUEL FORTUÑO, DECEASED.

TICKET HOLDER AND REGISTER.

SPECIFICATION forming part of Letters Patent No. 604,923, dated May 31, 1898.

Application filed September 9, 1897. Serial No. 651,131. (No model.)

*To all whom it may concern:*

Be it known that MANUEL FORTUÑO, deceased, late a citizen of the Republic of Mexico, and a resident of the City of Mexico, in the Republic of Mexico, did in his lifetime invent certain new and useful Improvements in Ticket Holders and Registers, of which the following is a full, clear, and exact description.

The invention relates to a combined ticket-holder and ticket-register to be used on street-cars, steamboats, in theaters, parks, or other places where a uniform entrance-fee is charged.

The objects of the invention are to prevent the repeated sale of one and the same ticket; also, to prevent any handling or manipulation of the ticket-strip or individual tickets by the conductor or other person employed to sell the tickets, to give an audible signal each time a ticket is sold, and to obviate the necessity of employing other means than the apparatus itself for registering the number of tickets sold.

The apparatus is designed to fully meet the requirements of the parties or companies selling and of the public buying the tickets.

The improved ticket-holder belongs to that class of holders which comprise a reel for carrying a continuous ticket ribbon or strip, means for feeding a length of strip corresponding to the length of the ticket out of the apparatus, and a registering device operatively connected with the said feed device.

The invention consists of certain parts and details and combinations of the same that will be hereinafter described and claimed.

Reference is to be had to the accompanying drawings, in which—

Figure 5:
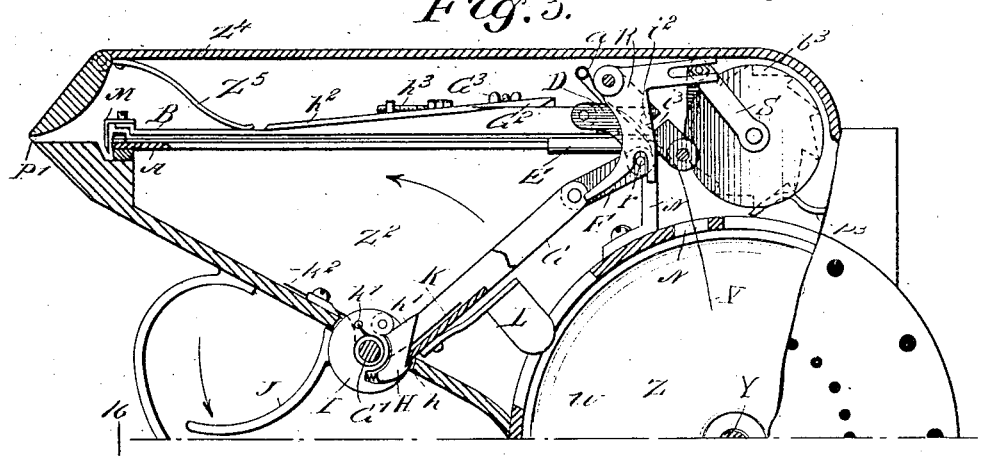
Figure 6:
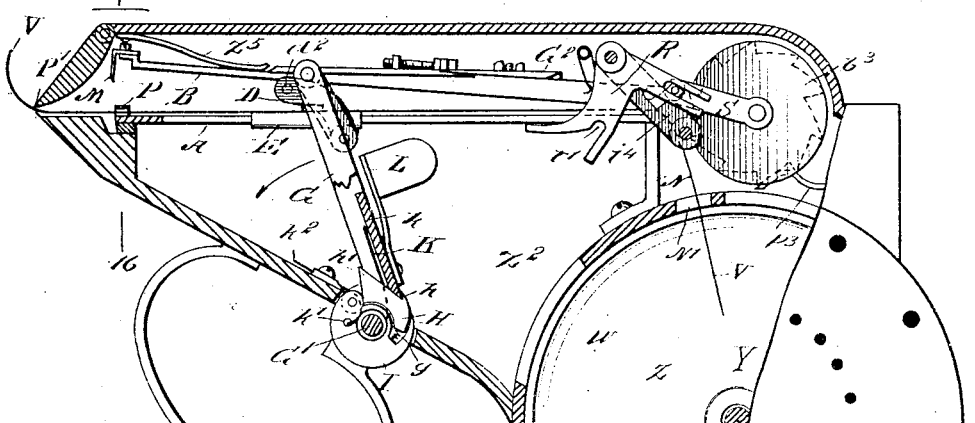
Figure 7:
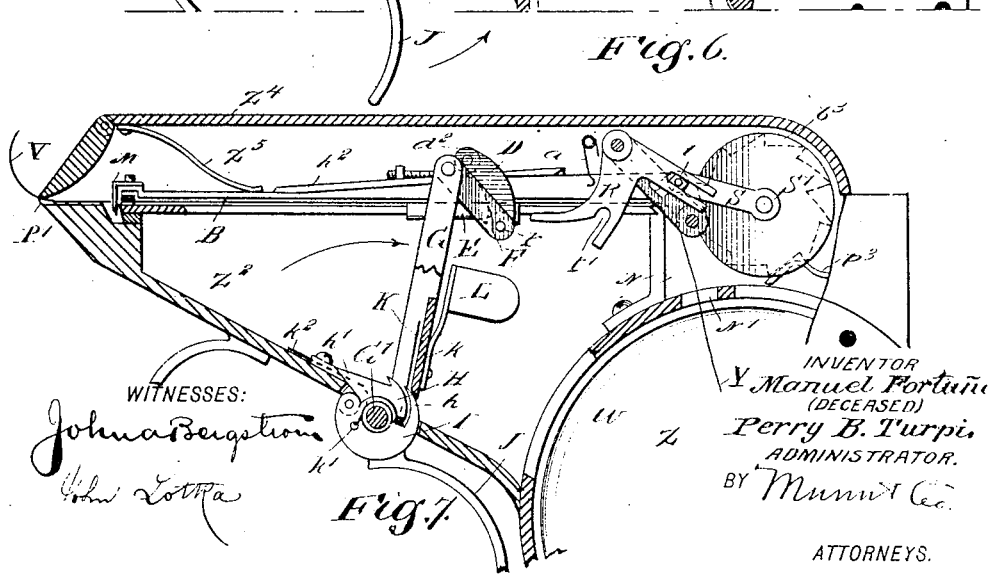

Figure 1 is a perspective view of the apparatus. Fig. 2 is a detail plan illustrating a portion of the ticket-feed device. Fig. 3 is a perspective view representing another part of the feed device. Fig. 4 shows the pawl for operating the registering mechanism. Figs. 5, 6, and 7 are broken longitudinal sections of the apparatus, taken on the line 5 5 of Fig. 9 and showing three different positions of the feed device. Fig. 8 is a similar view taken on line 8 8 of Fig. 9, the parts being in the same position as in Fig. 5. Fig. 9 is a plan of the apparatus, the lid being shown in section substantially on line 9 9 of Fig. 8. Figs. 10, 11, and 12 are sectional plans illustrating the registering-wheels and their actuating-pawl. Fig. 13 is a sectional elevation on line 13 13 of Fig. 8 with parts broken away. Figs. 14 and 15 are similar views on lines 14 14 and 15 15 of Fig. 8. Fig. 16 is a broken vertical section on line 16 16 of Fig. 6; and Fig. 17 is a detail view, with parts in section, showing the mode of securing the ticket-reel to its shaft.

Similar letters and numerals indicate similar parts in all the views.

The apparatus consists, primarily, of a casing preferably made in a shape somewhat similar to that of a pistol or revolver, as shown in Fig. 1. The casing comprises two sections or compartments $Z$ and $Z^2$. The compartment $Z$ is a circular one and adapted to contain a reel $U$, on which is wound a continuous ribbon-strip of tickets $V$. The reel is carried on an axis $Y$, which carries also a signal-bell $W$. The casing is provided with perforations $z$ for the escape of the sound. $X$ is a catch pivoted to the face of the reel and provided with a notch to engage with the axis $Y$, under the screw-head of the latter, by which the reel is held on the axis.

$Z'$ is a lid for the compartment $Z$, hinged to the casing and provided with a small perforated lug $z^2$, through which is adapted to pass a finger $z^3$ of a lid or cover $Z^4$ for compartment $Z^2$. In compartment $Z^2$ is contained the mechanism for feeding the ticket-strip out of the apparatus and for registering each ticket used. The strip $V$ is passed from the reel-compartment $Z$ to the compartment $Z^2$ through a slot $N'$ and over a vertical plate $N$, thence onto a plate $A$, the strip passing under the clamps $D$, Fig. 9, pivoted to a plate $E$, which slides longitudinally on plate $A$. The strip passes along plate $A$ under a clasp $P$, Figs. 3 and 6, at the outer end of the plate $A$, the clasp serving to prevent the strip from being raised with the knife $M$, to be described presently, and finally out of slot $B'$ in the end of the casing. The strip $V$ is fed forward at intervals by clamps $D$, pivoted to the sliding plate $E$, which in turn is moved by arms $F$, pivoted to levers $G$, which are hung on a shaft G′, mounted in the bottom of the casing and on which shaft is mounted a trigger J.

The trigger J is provided with a hub I, which has a cut-away portion g, and a spring-pressed pawl H, located in said portion and pivoted to the hub I. The pawl is formed with a tooth h. The said tooth is adapted to engage a cross-bar k, connecting the levers G. The cross-bar is also engaged by one end of a spring K, coiled upon the shaft G′ on each side of the hub, the other end of the spring being secured at k′ to the hub I and a loop k² of the spring bearing against the casing. The pawl H is further provided with a projection h′, adapted to strike against the casing in the position represented in Fig. 7. The lever-arms F are provided at their ends with pins r, which work in slots r′ of the vertical arms of plates R, pivoted to the side of the casing. Another arm of each plate R extends at right angles to the former arm and engages with the end of a rod t, supported on arms S, which are secured to a shaft S′, carrying independently-rotatable registering and numbered wheels $b'$ $b^2$ $b^3$. These wheels are each made integral with a toothed disk $b^4$, $b^5$, and $b^6$, respectively. The shaft S′ is mounted on spring side bars $s^2$, bolted to the inner sides of the casing. Each of the above-mentioned toothed disks engages with a tooth on the spring-pressed pawl c, Fig. 9, hung on rod t in front of the wheels. These pawl-teeth $e'$ $e^2$ $e^3$ are of unequal length, corresponding to the deepest indentation of each of the disks $b^4$ $b^5$ $b^6$. Each of these disks also engages with spring-pawls $p'$ $p^2$ $p^3$, secured to a rod $p^4$, mounted in the casing in front of the disks and numbered wheels to hold the wheels in place when set. The wheels are numbered from "1" to "0." On operating the trigger and its connecting-levers and the carrier-plate the rod t is given an oscillating motion, and the first tooth e′ thereon engages with the first toothed disk $b^4$, Fig. 10, and rotates it until the figure "9" on the first wheel b′ registers with the opening O of the casing. Then the second shorter tooth $e^2$ engages with the second disk, Fig. 11, and rotates that, and the third and shortest tooth $e^3$ rotates the third disk and wheel when the first two have reached "9," Fig. 12.

The clamp-arms D, as described, are pivoted to the sliding plate E, and when in their rear position are engaged by springs a, secured to the casing and serving to hold said clamp-arms down upon the strip V in the above-mentioned position. The arms D are provided at their upper ends with rollers $d^2$, adapted to act as guides, and antifriction-rollers to guide the clamp-plates relatively to the plate B, arranged above the ticket-supporting plate A. The plate B is provided at one end with a pivot-rod $i^2$, Fig. 14, which is adapted to enter slots $i^3$ on side arms $i^4$, rigidly secured to the casing. The opposite end of the plate is provided with a notched perforating knife or blade M, Fig. 16, for perforating the tickets near their ends in front of the clasp P. It will be noticed that the plate B has on each of its upper edges a flange $h^2$, which is inclined downward and forward and is gradually reduced in thickness at its inner end. On top of these flanges, at the rear ends thereof, is placed a movable plate $G^2$, which can be set forward or back on the flanges $h^2$ by means of a horizontal set-screw $h^3$, which extends from a bracket on the plate B to a bracket on the plate $G^2$. The latter and the flanges $h^2$ have been omitted from Fig. 14 for the sake of clearness. The plate $G^2$ is also provided with a vertical set-screw $G^4$. The flanges of plate $G^2$ are gradually reduced in thickness at their outer ends. It will be understood that by these means the plate $G^2$ may be adjusted longitudinally of the plate B. The rollers $d^2$ are adapted to engage the flanges of the plates B and $G^2$. Pressure upon the plate B to hold it down is exerted by a spring $Z^5$, secured to the under side of the lid $Z^4$ when that lid is closed down upon the casing.

1 2 3 are combination lettered rotary dials at the front of the casing, each provided with a post 4, having conical ends, and each post provided at its end with a slot and hole 5. When these slots are in a vertical upward position on turning a given combination, they receive the teeth, such as 6, formed on the inside of the end of the lid $Z^4$, and on pressing the lid down the teeth are forced in said slots and are secured in the post-hole so as not be withdrawn by turning the dial-plates, and the dial-plates are registered in the same way to release the lid. As each ticket is registered when it is reeled out and torn off a signal on the bell is given by a hammer L, secured to the cross-bar k.

In order that the apparatus may be carried on the person of the conductor, it is provided with a perforated knob $o^3$, through which a cord may be passed.

As an inducement to passengers to tear off the tickets and to keep watch that the proper register is given, a free ticket is given at variable intervals, and for this purpose the word "Free" is printed on such ticket.

The apparatus is used as follows: The normal position of the several parts is shown in Figs. 5 and 8. The conductor or other person pulls the trigger J, and thereby causes the levers G to swing forward, the plate E sliding on the plate or bed A under the ticket-strip V. The clamp-plates D also move forward and the rollers $d^2$, carried thereby, enter under the flanges of the plate $G^2$. (See Fig. 15.) As the said flanges are inclined downward and forward the rollers $d^2$ by their forward movement will cause the front end of the plate B to rise with the knife M, Fig. 6, so that the ticket-strip V can be fed forward by the clamp-plates D as the latter are pressed downward by the plates $G^2$ and B, on which the spring $Z^5$ exerts downward pressure. When the rollers $d^2$ clear the front ends of the flanges $h^2$, the spring $Z^5$ throws the plate B down upon the strip V and the pressure is removed from the rollers $d^2$ of the clamp-plates, so that the strip will cease to be fed forward by a continued pull on the trigger. The knife M perforates the strip when the plate B swings down. At about the same time the projection $h'$ of the pawl H strikes the wall of the casing, Fig. 7, which causes the said pawl to swing on its pivot against the pressure of the spring interposed between the hub I and the pawl H, whereby the tooth $h$ is carried out of engagement with the cross-bar $k$, whereupon the said cross-bar and the levers G and other parts connected therewith will be thrown rearward by the springs K. During this movement the rollers $d^2$ of the clamp-plates D will travel over the flanges $h^2$ and the plate $G^2$, as will be understood by reference to Fig. 7. When the rollers clear the rear end of the plate $G^2$, the springs $a$ will engage the clamp-arms D and turn them downward upon their pivots until the clamps rest again upon the ticket-strip V and are in position to enter under the flanges of the plate $G^2$, Fig. 5. The ticket protruding from the apparatus may then be torn off by the passenger or other person. The springs K will also return the trigger to its original position. During the forward movement of the levers G the pivoted plates R are turned from the position shown in Fig. 5 to that illustrated by Figs. 6 and 7, whereby the pawl $c$ is caused to turn the registering device. When the levers G return, the plates R and pawl $c$ are moved back to their former position, the pawl sliding over the toothed disks of the registering device without actuating the same. When the levers G are thrown back by the springs K, the hammer L strikes the bell W.

It will be observed that the length of the portion of the ticket-strip V fed forward at each operation of the trigger depends on the distance between the rear end of the flanges of the plate $G^2$ and the front end of the flanges $h^2$, as the plates D exert a clamping and feeding action only so long as they are pressed downward by the said flanges. It will therefore be obvious that by adjusting the plate $G^2$ longitudinally of the plate B the length of the strip portion fed may be varied, and thus the same apparatus may be adapted for use with tickets of different lengths.

Having thus described the invention, it is declared that what is claimed is—

1. The ticket-strip holder and carrier herein described, consisting in the combination with the casing divided into two compartments, each compartment provided with a locking-lid, of the rotating ticket-strip reel within one compartment, and the mechanism for carrying and forcing the strip through and out of the apparatus located in the other compartment, and consisting of a plate on which the strip is supported, a sliding plate provided with clamping-arms to clamp the strip and carry it along, and mechanism for moving said sliding plate, said mechanism consisting of a spring-controlled trigger outside of the apparatus, a shaft on which said trigger is mounted, and a spring-controlled lever mechanism mounted on the said shaft and operatively connected to the trigger and to the said sliding plate, substantially as described.

2. The combination with the casing consisting of two separate compartments each provided with a hinged cover and interlocking parts secured to the said covers, of a rotary ticket-strip reel within one compartment, and a feeding device for the strip located in the other compartment, and consisting of a supporting-plate for the strip, a sliding plate provided with clamping-arms to clamp the strip and carry it along, and a lever mechanism for moving said sliding plate, substantially as described.

3. The casing provided with the combination lettered rotary dial-plates, a post connected to each of said dial-plates, each post being provided with a slot and hole, in combination with the lid of the casing provided with teeth to engage with said slotted posts and lock the casing, substantially as described.

4. In a ticket-strip holder the combination of the supporting-plate, the reciprocating, clamp-carrying slide, and the lever mechanism for actuating said slide, substantially as described.

5. The combination with the casing, of the rotary reel on which the ticket-strip is rolled, a supporting-plate over which the strip is carried, the said casing being provided with a slot in the end opposite the end carrying the reel, a sliding plate provided with clamping-arms to clamp the strip and carry it along at intervals, and a lever mechanism for moving said sliding plate, substantially as described.

6. The combination, with the casing, of the rotary reel adapted to receive the ticket-strip, the plate on which said strip is carried, the reciprocating slide and its actuating mechanism, said slide having clamping-arms and rollers, and the top plate adapted to rest on said rollers for pressing the clamping-arms down on the strip, substantially as described.

7. The casing composed of a cylindrical compartment, the ticket-reel in said compartment, and an elongated compartment, in combination with the trigger pivoted in the bottom of the elongated compartment, a sliding plate carrying clamps and located in said compartment, and a lever mechanism connecting said trigger and said sliding plate, substantially as described.

8. In combination with the casing, the spring-controlled trigger, the shaft on which said trigger is mounted, the levers likewise mounted on said shaft, the ticket-feed device connected with said levers, and the pawl on the trigger to hold and release the lever mechanism, substantially as described.

9. The combination with a casing, the numbered register-wheels and the notched disks on the said wheels, of the pawl provided with teeth of unequal length to engage with and turn said disks, the ticket-feed device in the casing, consisting of the clamp-carrying slide, and the lever mechanism for actuating said slide, and connections between said feed device and the said pawl to actuate the latter, as and for the purpose described.

10. The combination, with the supporting-plate for the ticket-strip, and the feed device, of a top plate pivoted at one end and extending over the supporting-plate, and a blade secured to said plate for cutting the ticket-strip, substantially as and for the purpose described.

11. The combination, with the plate adapted to support the ticket-strip, and a device for feeding said strip forward, of the movable top plate extending over said supporting-plate, and a longitudinally-adjustable plate on the said top plate, the action of the feed device being controlled by the said top plate and adjustable plate, substantially as described.

12. The combination, with the plate adapted to support the ticket-strip, of the movable top plate extending over said supporting-plate, a slide having reciprocating movement longitudinally of the supporting-plate, and feeding-clamps operatively connected to said slide and provided with guides arranged to pass alternately over and under the top plate to feed and release the ticket-strip, substantially as described.

13. The combination with the supporting-plate for the ticket-strip, of a pivoted and spring-pressed top plate extending over the supporting-plate and provided with a blade, a feed device for the ticket-strip, and means for moving the said top plate to permit of feeding the ticket-strip forward, substantially as described.

14. The combination of the casing, the ticket-strip reel therein, the supporting-plate for the ticket-strip, the sliding plates provided with arms to clamp the strip and carry it along, and mechanism for operating said sliding plates, substantially as described.

15. The combination with the casing, of the reel on which the ticket-strip is rolled, a supporting-plate for the strip, a sliding plate provided with clamping-arms to clamp the strip and carry it along, a lever mechanism for moving said sliding plate, and a registering device arranged to be operated by the movement of the said lever mechanism, substantially as described.

PERRY B. TURPIN,
*Administrator of Manuel Fortuño, deceased.*

Witnesses:
CHAS. A. PETTIT,
SOLON C. KEMON.